United States Patent [19]
Whisenant

[11] Patent Number: 5,103,584
[45] Date of Patent: Apr. 14, 1992

[54] PLANT CULTIVATION APPARATUS AND METHOD

[76] Inventor: Blake Whisenant, P.O. Box 207 - Hwy. 62, Parrish, Fla. 34219

[21] Appl. No.: 513,292

[22] Filed: Apr. 24, 1990

[51] Int. Cl.$^5$ .............................................. A01G 25/00
[52] U.S. Cl. ...................................................... 47/79
[58] Field of Search .......................... 47/79, 84, 80, 81

[56] References Cited

U.S. PATENT DOCUMENTS

| 1,133,735 | 3/1915 | Malone | 47/79 |
| 1,773,020 | 8/1930 | Willis | 47/79 |
| 3,704,545 | 12/1972 | Van Reisen | 47/84 |

FOREIGN PATENT DOCUMENTS

| 2539552 | 3/1977 | German Democratic Rep. | 47/81 |
| 6602933 | 9/1966 | Netherlands | 47/80 |
| 8202349 | 1/1984 | Netherlands | 47/81 |

Primary Examiner—H. E. Raduazo

[57] ABSTRACT

The present invention is a plant cultivation system comprising a container having a bottom surface and a peripheral wall extending from the bottom surface and terminating at an upper edge, thereby defining an enclosed volume. A first partition in the enclosed volume defines a liquid reservoir and a second partition disposed vertically above the first partition and within the enclosed volume defines a plant growing area. The second partition has a first opening which is in substantial vertical alignment with a hole in a lid of the container and a second opening which is spaced a selective distance from the first partition. The lid engages the upper edge of the container and the container has evaporation vents which are spaced from the opening in the lid.

11 Claims, 1 Drawing Sheet

PLANT CULTIVATION APPARATUS AND METHOD

FIELD OF THE INVENTION

The present invention relates to a plant cultivation apparatus and method which minimizes the quantity of water required to produce mature plants by reducing evaporation losses during the growth period.

BACKGROUND OF THE INVENTION

In the cultivation of many types of plants, a number of structures for housing the growth medium have been designed to enable the grower to closely control the amount of water that is delivered to the plant as well as the integrity of the growth medium. These designs have generally provided a container for the growth medium along with an irrigation system for supplying water and other nutrients to the growth medium and plant roots. As compared to the natural cultivation of plants directly in the ground, the use of containers to house the growth medium has not been as popular due to many factors. The foremost factor is the expense of using a container. An additional expense is due to the rapid depletion of the nutrients in the growth medium. The confining container can also promote the growth of undesirable parasites and fungi, thereby offsetting any advantages in the use of the containers. Finally, evaporation of water from the container can result in salt accumulation at the plant roots which will stunt plant growth or even cause death of the plant itself. The salt accumulation can only be avoided by a significant investment in manually conditioning the growth medium.

SUMMARY OF THE INVENTION

The present invention is an improved container system and method of use which avoids the problems of the prior art and which provides a plant cultivation system that produces superior plant growth. The invention is particularly successful in cultivating a number of vegetable types and significantly reduces the amount of water loss due to evaporation while preventing salt deterioration of the growth medium.

In a preferred embodiment, the present invention provides a container with a lid. The container has a first partitioned area which defines a liquid reservoir and a second partitioned area which defines a plant growing area. The interior volume of the container which is outside the two partitioned areas is filled with a plant nutrient medium. The plant growing area has a first opening which is open to the atmosphere by means of an opening in the lid and a second opening in communication with the interior volume of the container. The liquid reservoir also has a open end which communicates with the interior volume of the container. A conduit is provided which connects the liquid reservoir to the exterior of the container. The container also has at least one vent to provide for evaporation of the liquid.

The plant growing area contains a plant growing medium in which a plant seed or stripling is planted. As the plant grows, it will grow through the first opening in the plant growing area which communicates with the exterior of the container.

According to the method of the present invention, the opening about the plant's stem is kept as small as possible to prevent or minimize evaporation of water at the site. By this arrangement, the cultivation system of the present invention may be left unattended for several days as the reservoir will continuously supply the required level of moisture to the growing medium. Salt deposits resulting from evaporation will be maintained at the container vents which are remote from the developing roots of the plant. The conduit provides means for draining excess liquid from the liquid reservoir to the outside of the container.

The foregoing and other advantages will become apparent as consideration is given to the following detailed description taken in conjunction with the accompanying drawings.

DETAILED DESCRIPTION OF THE INVENTION

Figure 1:
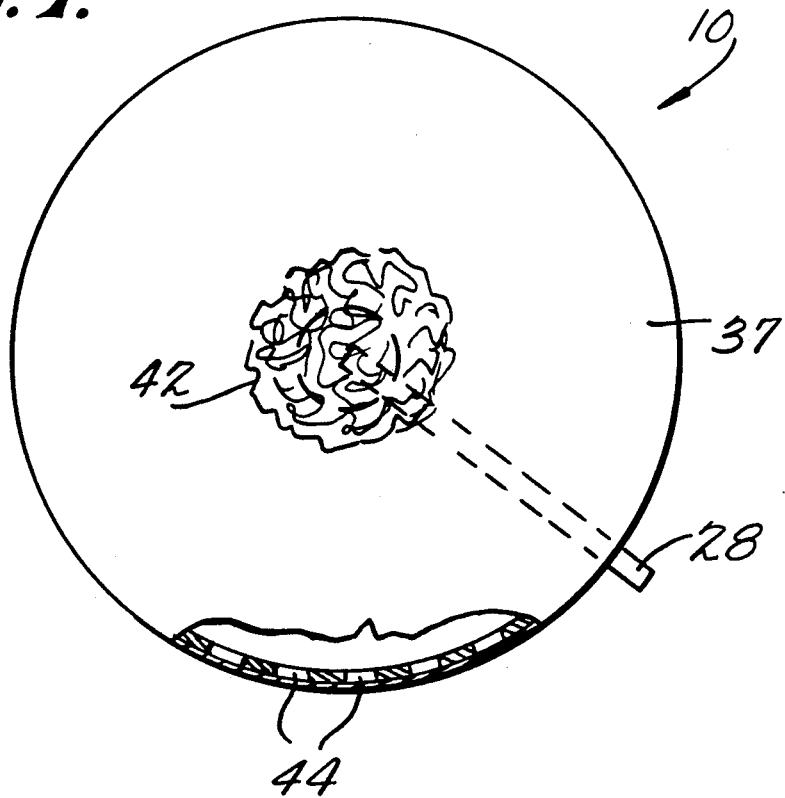
FIG. 1 a top view of the cultivation system of the present invention.
Figure 2:
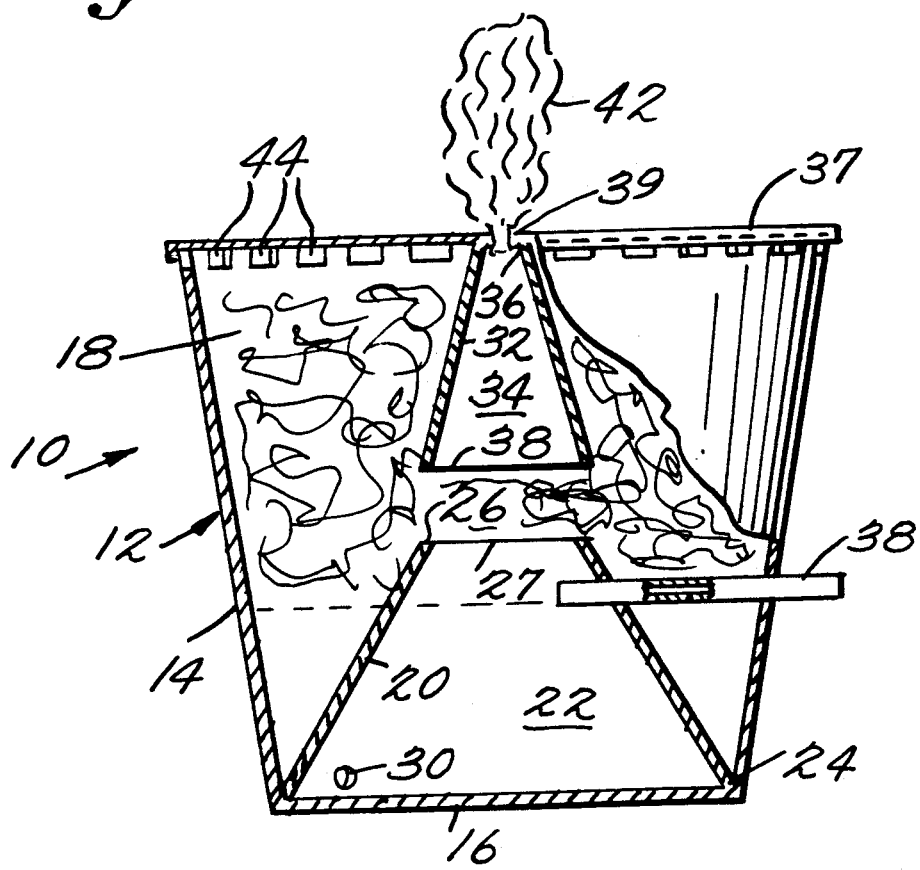
FIG. 2 is a sectional view in elevation of the cultivation system of the present invention.

Referring now to the drawings where like numerals designate corresponding parts throughout the views, there is shown in FIGS. 1 and 2 a preferred embodiment of the plant cultivation system 10 of the present invention. The system 10 includes a container 12 having a peripheral wall 14 and a bottom surface 16. The peripheral wall 14 and the bottom surface 16 define an interior volume 18 of the container 12. A partition 20 which defines a liquid reservoir 22 is provided in the interior volume 18. The partition 20 has a first end 24 engaging the bottom surface 16 and a second end 26 which is open to the interior volume 18. The second open end 26 is covered with a screen 27. The screen 27 prevents solid materials from entering the liquid reservoir 22.

A conduit 28 is connected through the peripheral wall 14 and the partition 20 and provides a passageway from the liquid reservoir 22 to the exterior of the container 12. The liquid reservoir 22 is partially filled with a liquid, preferably water. Nutrients, minerals, fungicides and the like can be added to the liquid. The conduit 28 provides a drainage passageway through which excess liquid in the reservoir is drained, thereby, automatically controlling liquid level in the reservoir. Since the conduit is placed at a level below the top of the liquid reservoir 22, there is an air space between a top surface of the liquid and the screen 27. A passageway 30 is provided in the first partition 20 adjacent the bottom surface 16. This passageway 30 provides means through which the liquid in the liquid reservoir 22 flows to the space defined by the interior volume 18.

The container 12 is also provided with another partition 32 which defines a plant growing area 34 and which has a first opening 36 and second opening 38. The partition 32 engages with an opening 39 in the container lid 40 so that the first opening 36 is in communication with the exterior of the container 12 and provides an opening through which a plant 42 may grow. In a preferred embodiment, the partition 32 is attached to lid 40 so that the opening 39 and the opening 38 are in alignment with each other. The second opening 38 is in communication with the interior volume 18.

The plant growing area 34 is at least partially filled with a plant growing medium into which a seed or plant stripling will be implanted. As illustrated, a user will deposit seed material immediately, vertically below the first opening 36 to an appropriate depth depending on the type of plant to be grown or, in the case of a stripling, the stripling will be planted to the appropriate depth through the opening 36. The plant receives nutrients from a plant nutrient medium which at least partially fills the interior volume 18 which is outside of the plant growing area 34 and the liquid reservoir 22. Moisture is supplied to the plant nutrient medium from the liquid reservoir 22 through passageway 30. The plant nutrient medium then transmits the moisture to the plant growing medium in the plant growing area 34.

The container 12 is provided with at least one vent 44 which allows for evaporation of the liquid. In a preferred embodiment, a plurality of vents 44 are provided. These vents 44 are located near an upper edge of the container 12 and are remote from the growing area 34. Evaporation of the liquid can cause minerals and salts contained in the liquid to be evaporated out of the liquid and deposit at the point of evaporation. By locating the vents 44 remote from the growing area 34 and by the provision of root confining partition 32, accumulation of these mineral or salt deposits will have no affect on the growth or health of the plant since they do not come into contact with the roots in the plant growing area 34 or the plant itself. Thus, it can be seen how the partition 32 protects the plant and its roots. As seen in FIGS. 1 and 2, the direction of the evaporation of the liquid is marked by the arrows at the vents 44. In a preferred embodiment, the vents 44 are notched recesses in an upper surface of the container 12 and are not obstructed by the lid 40.

After the completion of a growing season, the conduit 22 can be plugged s that the container 12 can be completely filled with water for a period of time to kill off any accumulated fungi or parasites that may have developed during the growing season. The subsequent addition of suitable nutrients to the sterilized medium can then be effected so that the necessity for removing the plant growing medium from the plant growing area 34 is avoided.

The use of the cultivation system of the present invention will result in substantial savings in the amount of water required for healthy plant growth than would otherwise be the case where free drainage of water added to the container is Having described the invention, it would be apparent to those skilled in this art, that various modifications may be made thereto without departing from the spirit and scope of this invention as defined in the appended claims.

What is claimed is:

1. A plant cultivation system comprising container means having a bottom surface and peripheral wall means extending from said bottom surface and terminating at an upper edge to thereby define an enclosed volume, first partition means in said volume defining a liquid reservoir, said first partition means having a first end engaging said bottom surface of said container means, said first partition means also having a second open end spaced away from said first end with a screen means extending over said second open end, said first partition means further having a passage provided therein adjacent to said bottom surface, said first partition means being provided with a liquid level control means to control the liquid level in said liquid reservoir, said liquid level control means comprising a conduit means connecting said liquid reservoir to the atmosphere outside said container means, said conduit means extending through said first partition means at a site adjacent to said second open end of said first partition means and also extending through said peripheral wall of said container means, second partition means disposed vertically above said first partition means and defining a plant growing area in said enclosed volume, said second partition means including an edge defining a first opening to said growing area and an opposite end having an edge defining a second opening to said growing area, said second opening of said second partition means being spaced a selected distance from said first partition means, cover means for engaging said upper edge of said container means, said cover means having an opening therethrough for allowing plant growth, said container means having evaporation venting means spaced away from said opening in said cover means.

2. The invention as claimed in claim 1 wherein said one end of said second partition means is joined to said lid about said opening in said lid.

3. The invention as claimed in claim 10 wherein said first partition means has a first end engaging said bottom surface of said container means, a passage being provided in said first partition means adjacent to said bottom surface.

4. The invention as claimed in claim 3 wherein a second open end is spaced from said first end thereof and a screen means extends across said second open end.

5. The invention as claimed in claim 4 wherein a liquid level control means is provided to control the liquid level in the liquid reservoir.

6. The invention as claimed in claim 1 wherein said conduit means extends horizontally in use so as to limit the quantity of liquid accumulated in said liquid reservoir.

7. The invention as claimed in claim 1 wherein said evaporation venting means comprises at least one notch recess formed in said upper edge of said peripheral wall.

8. The invention as claimed in claim 7 wherein a plurality of notch recesses are provided in said upper edge of said peripheral wall and which are spaced apart along said upper edge.

9. A plant cultivation system comprising container means having a bottom surface and a peripheral wall extending from said bottom surface and terminating at an upper edge to thereby enclose an interior volume, first partition means in said volume defining an interior chamber for serving as a reservoir for liquid and further defining a portion of enclosed volume external to said interior chamber, second partition means disposed vertically above said first partition means in said interior volume and defining a plant growing area in said interior volume, said second partition means having one end including an edge defining a first opening to said growing area and an opposite end having an edge defining a second opening to said area, said second opening of said second partition means being spaced a selected distance from said first partition means, the portion of said enclosed interior volume external to said chamber and said plant growing area having a selected quantity of a plant nutrient medium disposed therein, said plant growing area including a plant growing medium substantially filling said plant growing area, a lid for engaging said upper edge of said container means, said lid having an opening therethrough positioned so that said opening in said lid will be in substantial vertical alignment with said first opening of said second partition means when said lid is engaged on said upper edge, said container means having evaporation venting means spaced from said opening in said lid.

10. The invention as claimed in claim 9 wherein said first partition means includes a first end engaging said bottom surface of said container means and a second open end spaced from said first end thereof, screen means extending across said second open end and said nutrient medium filling the space between said screen means and said second opening of said second partition means.

11. The invention as claimed in claim 9 wherein said evaporation venting means comprises at least one notch recess formed in said upper edge of said peripheral wall and a fertilizer medium is disposed in said nutrient medium adjacent said upper edge of said peripheral wall.

* * * * *